US012681771B2

(12) United States Patent
Zeng et al.

(10) Patent No.: US 12,681,771 B2
(45) Date of Patent: Jul. 14, 2026

(54) METHOD AND SYSTEM FOR ALLOCATING LIMITED RESOURCES TO ENTITIES THAT REVEAL THEIR STOCHASTIC DEMANDS ON ARRIVAL OVER A FINITE HORIZON IN A PROPORTIONALLY FAIR MANNER

(71) Applicant: JPMorgan Chase Bank, N.A., New York, NY (US)

(72) Inventors: Sihan Zeng, Atlanta, GA (US); Parisa Hassanzadeh, San Jose, CA (US); Eleonora Kreacic, London (GB); Sumitra Ganesh, Short Hills, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 342 days.

(21) Appl. No.: 18/232,053

(22) Filed: Aug. 9, 2023

(65) Prior Publication Data

US 2024/0152405 A1 May 9, 2024

Related U.S. Application Data

(60) Provisional application No. 63/420,295, filed on Oct. 28, 2022.

(51) Int. Cl.
*G06F 9/50* (2006.01)

(52) U.S. Cl.
CPC .......... *G06F 9/5077* (2013.01); *G06F 9/5072* (2013.01)

(58) Field of Classification Search
CPC ............................. G06F 9/5077; G06F 9/5072

USPC .......................................................... 718/104
See application file for complete search history.

(56) References Cited

U.S. PATENT DOCUMENTS

| | | | | |
|---|---|---|---|---|
| 10,728,317 | B1 * | 7/2020 | James ................. | H04L 67/1008 |
| 11,245,640 | B1 * | 2/2022 | Maurya .................... | G06F 17/18 |
| 2005/0198099 | A1 * | 9/2005 | Motsinger ............... | G06F 21/55 |
| | | | | 709/200 |
| 2006/0039319 | A1 * | 2/2006 | Lee ........................ | H04W 72/21 |
| | | | | 370/328 |
| 2010/0246394 | A1 * | 9/2010 | Omar .................. | H04W 36/385 |
| | | | | 370/312 |
| 2011/0167493 | A1 * | 7/2011 | Song ................... | H04L 63/1466 |
| | | | | 726/23 |
| 2016/0029403 | A1 * | 1/2016 | Roy ...................... | H04W 72/54 |
| | | | | 370/336 |

(Continued)

*Primary Examiner* — Adam Lee

(74) *Attorney, Agent, or Firm* — Greenblum & Bernstein, P.L.C.

(57) ABSTRACT

A system and a method for allocating limited resources to agents that reveal their stochastic demands on arrival over a finite horizon in a proportionally fair manner that exhausts available resource budgets are provided. The allocation of limited resources includes receiving a request for a resource for which a predetermined maximum amount of the resource is available for allocation during a predetermined time interval, and estimating a number of future requests expected to be received and amounts of the resource to be requested within the predetermined time interval. The initial estimates are then adjusted by calculating a standard deviation of an uncertainty of at least one future request, and an amount of the resource to allocated to a resource requesting entity is determined by applying an algorithm with respect to the adjusted estimates and the predetermined maximum available amount of the resources.

15 Claims, 5 Drawing Sheets

(56) References Cited

U.S. PATENT DOCUMENTS

| | | | |
|---|---|---|---|
| 2016/0164797 A1* | 6/2016 | Reque | H04L 47/83 |
| | | | 718/1 |
| 2020/0021634 A1* | 1/2020 | Li | H04L 65/70 |
| 2022/0405134 A1* | 12/2022 | Guo | G06N 3/044 |
| 2023/0057068 A1* | 2/2023 | Bhandarkar | H04L 43/16 |
| 2024/0168811 A1* | 5/2024 | Salch | G06F 9/5038 |

* cited by examiner

100

102

| Processor 104 Instructions | Memory 106 Instructions | Display 108 | Input Device(s) 110 | Medium Reader 112 Instructions | Network Interface 114 | Output Device(s) 116 |

Bus 118

Network 122

120

400

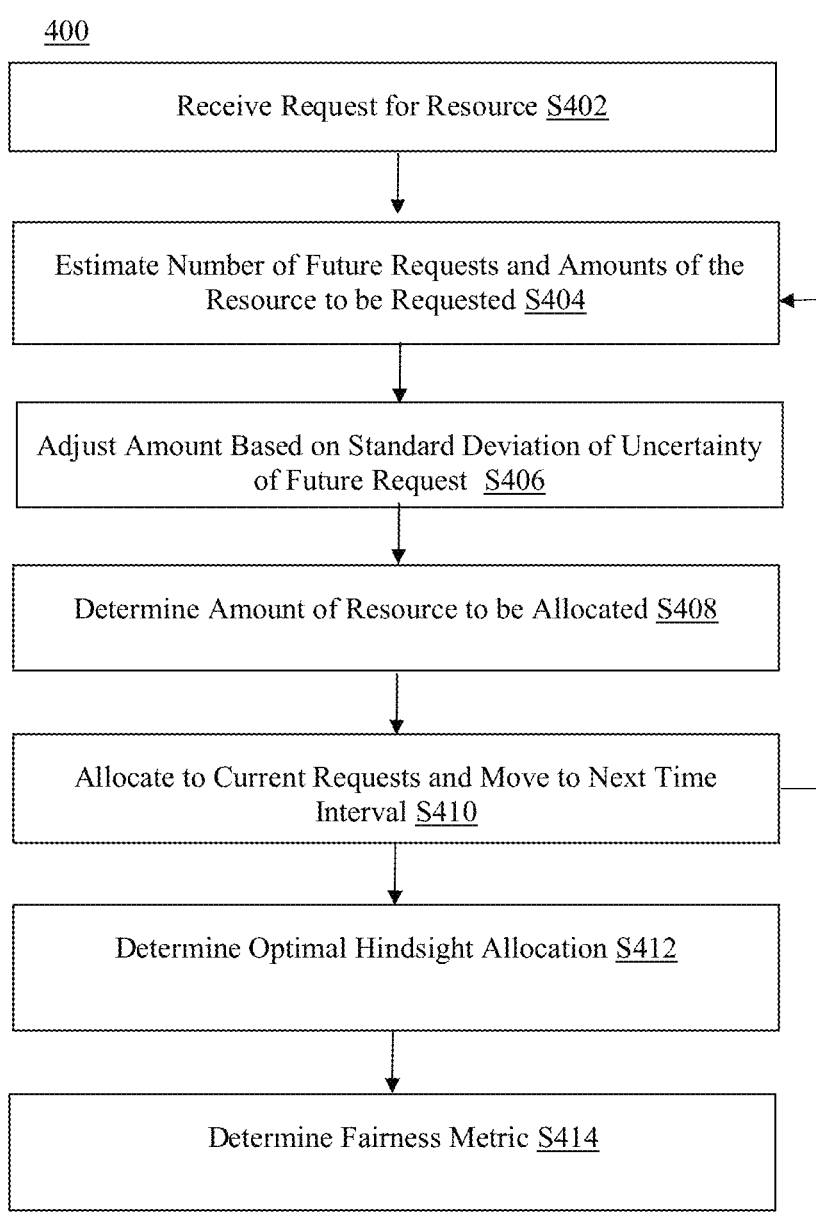

Receive Request for Resource S402

Estimate Number of Future Requests and Amounts of the Resource to be Requested S404

Adjust Amount Based on Standard Deviation of Uncertainty of Future Request S406

Determine Amount of Resource to be Allocated S408

Allocate to Current Requests and Move to Next Time Interval S410

Determine Optimal Hindsight Allocation S412

Determine Fairness Metric S414

Figures 5, 6:
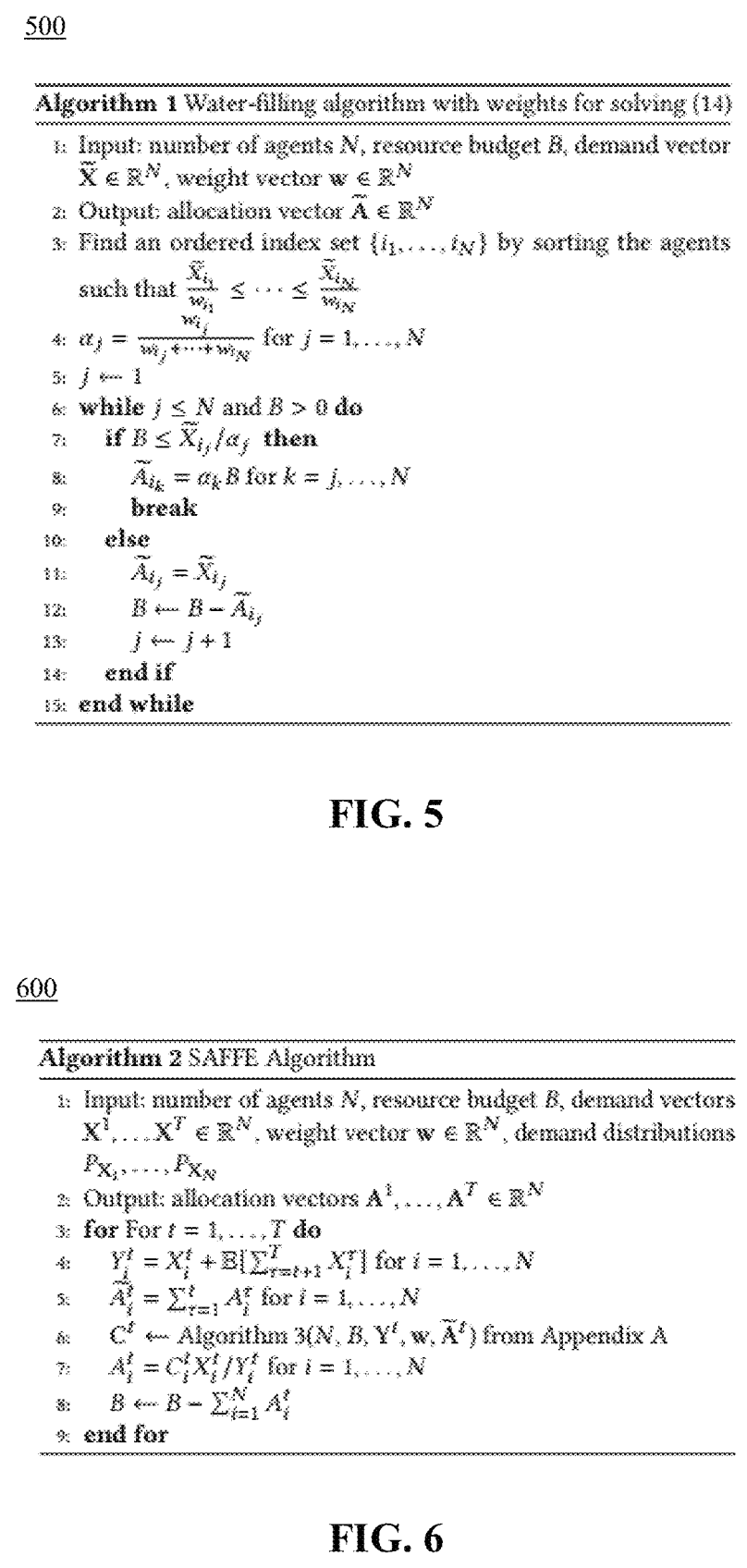

Algorithm 1 Water-filling algorithm with weights for solving (14)

1: Input: number of agents $N$, resource budget $B$, demand vector $\widetilde{X} \in \mathbb{R}^N$, weight vector $\mathbf{w} \in \mathbb{R}^N$
2: Output: allocation vector $\widetilde{A} \in \mathbb{R}^N$
3: Find an ordered index set $\{i_1, \ldots, i_N\}$ by sorting the agents such that $\frac{\widetilde{X}_{i_1}}{w_{i_1}} \leq \cdots \leq \frac{\widetilde{X}_{i_N}}{w_{i_N}}$
4: $\alpha_j = \frac{w_{i_j}}{w_{i_j} + \cdots + w_{i_N}}$ for $j = 1, \ldots, N$
5: $j \leftarrow 1$
6: while $j \leq N$ and $B > 0$ do
7:   if $B \leq \widetilde{X}_{i_j}/\alpha_j$ then
8:     $\widetilde{A}_{i_k} = \alpha_k B$ for $k = j, \ldots, N$
9:     break
10:   else
11:     $\widetilde{A}_{i_j} = \widetilde{X}_{i_j}$
12:     $B \leftarrow B - \widetilde{A}_{i_j}$
13:     $j \leftarrow j + 1$
14:   end if
15: end while

Algorithm 2 SAFFE Algorithm

1: Input: number of agents $N$, resource budget $B$, demand vectors $X^1, \ldots, X^T \in \mathbb{R}^N$, weight vector $\mathbf{w} \in \mathbb{R}^N$, demand distributions $P_{X_1}, \ldots, P_{X_N}$
2: Output: allocation vectors $\mathbf{A}^1, \ldots, \mathbf{A}^T \in \mathbb{R}^N$
3: for For $t = 1, \ldots, T$ do
4:   $Y_i^t = X_i^t + \mathbb{E}[\sum_{\tau=t+1}^{T} X_i^\tau]$ for $i = 1, \ldots, N$
5:   $\widetilde{A}_i^t = \sum_{\tau=1}^{t} A_i^\tau$ for $i = 1, \ldots, N$
6:   $C^t \leftarrow$ Algorithm 3($N, B, Y^t, \mathbf{w}, \widetilde{A}^t$) from Appendix A
7:   $A_i^t = C_i^t X_i^t / Y_i^t$ for $i = 1, \ldots, N$
8:   $B \leftarrow B - \sum_{i=1}^{N} A_i^t$
9: end for

METHOD AND SYSTEM FOR ALLOCATING LIMITED RESOURCES TO ENTITIES THAT REVEAL THEIR STOCHASTIC DEMANDS ON ARRIVAL OVER A FINITE HORIZON IN A PROPORTIONALLY FAIR MANNER

CROSS-REFERENCE TO RELATED APPLICATIONS

This application claims priority benefit from U.S. Provisional Application No. 63/420,295, filed Oct. 28, 2022, which is hereby incorporated by reference in its entirety.

BACKGROUND

1. Field of the Disclosure

This technology generally relates to methods and systems for allocating resources, and more particularly to methods and systems for allocating limited resources to agents that reveal their stochastic demands on arrival over a finite horizon in a proportionally fair manner that exhausts available resource budgets.

2. Background Information

The problem of multi-agent resource allocation arises in numerous disciplines, including economics, power systems, and cloud computing. This problem comes in various flavors, depending on the nature of resources, the agents' behaviors, the timing of allocation decisions, and the overall objective of the allocation process. A common element shared by various settings is the existence of one or more limited resources that need to be distributed to various agents based on their reported requests.

A resource can come in indivisible units, where a single unit of the resource must be allocated to at most one agent, or the resource can be divisible, if allocation can equal any amount of the resource. Agents can be strategic, i.e., they may misreport their requests in order to secure a preferred allocation. In the non-strategic setting, agents can be truthful, i.e., they take any allocation that is not larger than their request, or unreliable, i.e., although they do not misreport their demands in order to secure a preferred allocation, they take only a random fraction of their allocation.

There are various objectives that one might wish to optimize in the context of resource allocation. Budget minimization aims at improving the allocation efficiency and reducing the leftover inventory. Other objectives optimize efficiency along with various notions of fairness, among which Nash social welfare (NSW) is a well-known objective defined as the product of the agents' "happiness" with their allocation. In the offline setting, where an observation of all requests is made prior to making an allocation decision, NSW enjoys a few favorable properties, including being Pareto-efficient, i.e., for any other allocation there would be at least one agent who is worse off compared to the current one; envy-free, i.e., no agent prefers another agent's allocation; and proportionally fair, i.e., every agent gets their fair share of the resource; and thus exhausts the total budget.

In the online setting, with respect to the sequential allocation of divisible resources to non-strategic agents, the agents place requests in a sequential manner, and an irrevocable decision on the allocation must be made instantaneously. As the decision cannot be modified once it is made, every allocation affects the set of possible allocations that may be made later, which creates a conflict between fairness and efficiency. Qualitatively, to achieve fairness requires reserving the resource for anticipated future agents, while the resource may be wasted if the future agents do not arrive.

Accordingly, there is a need for a method for allocating limited resources to agents that reveal their stochastic demands on arrival over a finite horizon in a proportionally fair manner that exhausts available resource budgets.

SUMMARY

The present disclosure, through one or more of its various aspects, embodiments, and/or specific features or sub-components, provides, inter alia, various systems, servers, devices, methods, media, programs, and platforms for allocating limited resources to agents that reveal their stochastic demands on arrival over a finite horizon in a proportionally fair manner that exhausts available resource budgets.

According to an aspect of the present disclosure, a method for sequentially allocating a resource is provided. The method is implemented by at least one processor. The method includes: receiving, by the at least one processor from a first entity, a first request for a resource for which a predetermined maximum amount of the resource is available for allocation; estimating, by the at least one processor, a number of future requests and amounts of the resource to be requested within a predetermined time interval; adjusting, by the at least one processor, a result of the estimating by calculating a standard deviation of an uncertainty of at least one future request; and determining, by the at least one processor based on the adjusted result of the estimating, a first amount of the resource to be allocated to the first entity.

The determining of the first amount of the resource to be allocated to the first entity may include applying a first algorithm with respect to the predetermined maximum available amount of the resources and the adjusted result of the estimating.

The first algorithm may be designed to optimize a Nash Social Welfare (NSW) objective that is generalized for sequential settings.

The method may further include: when an actual allocation of the resource has been made to the first entity and the predetermined time interval has not elapsed and there is at least one unfulfilled future request, calculating an updated value of the maximum amount of the resource that is available for allocation based on the actual allocation of the resource that has been made to the first entity, and repeating the estimating and the adjusting based on the updated value of the maximum amount of the resource that is available for allocation in order to determine a second amount of the resource to be allocated.

The second amount of the resource may be intended to be allocated to the first entity. Alternatively, the second amount of the resource may be intended to be allocated to a second entity that is different from the first entity.

The method may further include: when the predetermined time interval has elapsed, using actual numbers of requests and amounts of the resource requested during the predetermined time interval to determine an optimal hindsight allocation of the resource with respect to the first entity.

The method may further include using the optimal hindsight allocation with respect to at least one from among the first amount and the second amount to determine a fairness metric that corresponds to the first entity.

The resource may include at least one from among an economic resource, a power systems resource, and a cloud computing resource.

According to another exemplary embodiment, a computing apparatus for sequentially allocating a resource is provided. The computing apparatus includes a processor; a memory; and a communication interface coupled to each of the processor and the memory. The processor is configured to: receive, via the communication interface from a first entity, a first request for a resource for which a predetermined maximum amount of the resource is available for allocation; estimate a number of future requests and amounts of the resource to be requested within a predetermined time interval; adjust a result of the estimation by calculating a standard deviation of an uncertainty of at least one future request; and determine a first amount of the resource to be allocated to the first entity based on the adjusted result of the estimation.

The processor may be further configured to determine the first amount of the resource to be allocated to the first entity by applying a first algorithm with respect to the predetermined available maximum amount of the resources and the adjusted result of the estimation.

The first algorithm may be designed to optimize a Nash Social Welfare (NSW) objective that is generalized for sequential settings.

The processor may be further configured to: when an actual allocation of the resource has been made to the first entity and the predetermined time interval has not elapsed and there is at least one unfulfilled future request, calculate an updated value of the maximum amount of the resource that is available for allocation based on the actual allocation of the resource that has been made to the first entity, and repeat the estimating and the adjusting based on the updated value of the maximum amount of the resource that is available for allocation in order to determine a second amount of the resource to be allocated.

The second amount of the resource may be intended to be allocated to the first entity. Alternatively, the second amount of the resource may be intended to be allocated to a second entity that is different from the first entity.

The processor may be further configured to: when the predetermined time interval has elapsed, use actual numbers of requests and amounts of the resource requested during the predetermined time interval to determine an optimal hindsight allocation of the resource with respect to the first entity.

The processor may be further configured to use the optimal hindsight allocation with respect to at least one from among the first amount and the second amount to determine a fairness metric that corresponds to the first entity.

The resource may include at least one from among an economic resource, a power systems resource, and a cloud computing resource.

According to yet another exemplary embodiment, a non-transitory computer readable storage medium storing instructions for sequentially allocating a resource is provided. The storage medium includes executable code which, when executed by a processor, causes the processor to: receive, from a first entity, a first request for a resource for which a predetermined maximum amount of the resource is available for allocation; estimate a number of future requests and amounts of the resource to be requested within a predetermined time interval; adjust a result of the estimation by calculating a standard deviation of an uncertainty of at least one future request; and determine a first amount of the resource to be allocated to the first entity based on the adjusted result of the estimation.

When executed by the processor, the executable code may be further configured to cause the processor to determine the first amount of the resource to be allocated to the first entity by applying a first algorithm with respect to the predetermined maximum available amount of the resources and the adjusted result of the estimation.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for allocating limited resources to agents that reveal their stochastic demands on arrival over a finite horizon in a proportionally fair manner that exhausts available resource budgets.

FIG. 5 is an algorithm to be applied for providing an optimal solution to a water-filling problem where an objective is to allocate limited resources to agents with differently weighted importance and the allocation is performed after the requests are observed, in a proportionally fair manner that exhausts available resource budgets, according to an exemplary embodiment.

FIG. 6 is an algorithm to be applied for providing sequential allocations with fairness based on future estimates in a method for allocating limited resources to agents that reveal their stochastic demands on arrival over a finite horizon in a proportionally fair manner that exhausts available resource budgets, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
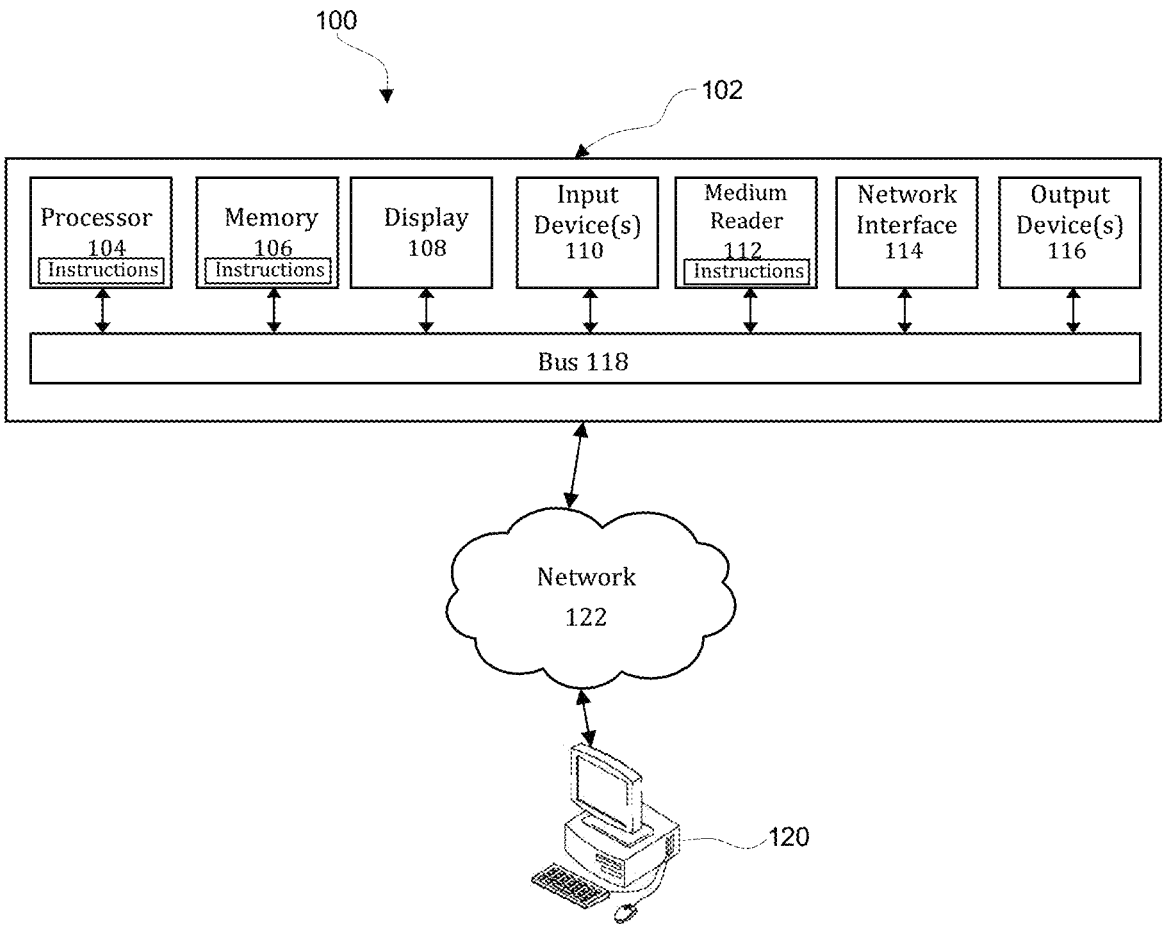
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for allocating limited resources to agents that reveal their stochastic demands on arrival over a finite horizon in a proportionally fair manner that exhausts available resource budgets.

Figure 2:
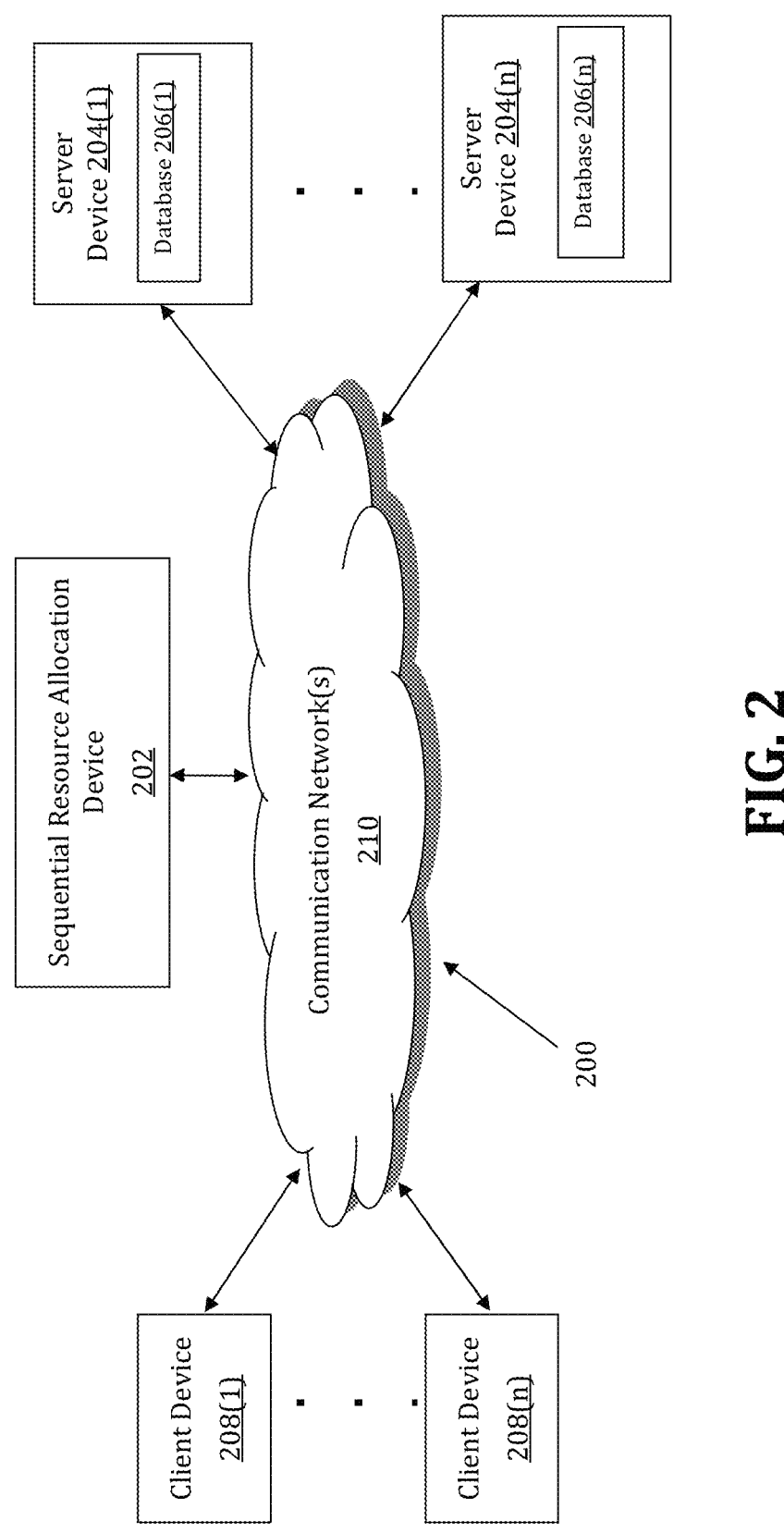
FIG. 2 illustrates an exemplary diagram of a network environment.

Referring to FIG. 2, a schematic of an exemplary network environment 200 for implementing a method for allocating limited resources to agents that reveal their stochastic demands on arrival over a finite horizon in a proportionally fair manner that exhausts available resource budgets is illustrated. In an exemplary embodiment, the method is executable on any networked computer platform, such as, for example, a personal computer (PC).

The method for allocating limited resources to agents that reveal their stochastic demands on arrival over a finite horizon in a proportionally fair manner that exhausts available resource budgets may be implemented by a Sequential Resource Allocation (SRA) device 202. The SRA device 202 may be the same or similar to the computer system 102 as described with respect to FIG. 1. The SRA device 202 may store one or more applications that can include executable instructions that, when executed by the SRA device 202, cause the SRA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SRA device 202 itself, may be located in virtual server(s) running in a cloud-based computing environment rather than being tied to one or more specific physical network computing devices. Also, the application(s) may be running in one or more virtual machines (VMs) executing on the SRA device 202. Additionally, in one or more embodiments of this technology, virtual machine(s) running on the SRA device 202 may be managed or supervised by a hypervisor.

In the network environment 200 of FIG. 2, the SRA device 202 is coupled to a plurality of server devices 204(1)-204(n) that hosts a plurality of databases 206(1)-206(n), and also to a plurality of client devices 208(1)-208(n) via communication network(s) 210. A communication interface of the SRA device 202, such as the network interface 114 of the computer system 102 of FIG. 1, operatively couples and communicates between the SRA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SRA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SRA devices that efficiently implement a method for allocating limited resources to agents that reveal their stochastic demands on arrival over a finite horizon in a proportionally fair manner that exhausts available resource budgets.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SRA device 202 may be a standalone device or integrated with one or more other devices or apparatuses, such as one or more of the server devices 204(1)-204(n), for example. In one particular example, the SRA device 202 may include or be hosted by one of the server devices 204(1)-204(n), and other arrangements are also possible. Moreover, one or more of the devices of the SRA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SRA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to resource availability and information that relates to metrics for resource allocation fairness.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SRA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SRA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SRA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SRA device 202, the server devices 204(1)-204(n), or the client devices 208(1)-208(n), for example, may be configured to operate as virtual instances on the same physical machine. In other words, one or more of the SRA device 202, the server devices 204(1)-204(n), or the client devices 208(1)-208(n) may operate on the same physical device rather than as separate devices communicating through communication network(s) 210. Additionally, there may be more or fewer SRA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
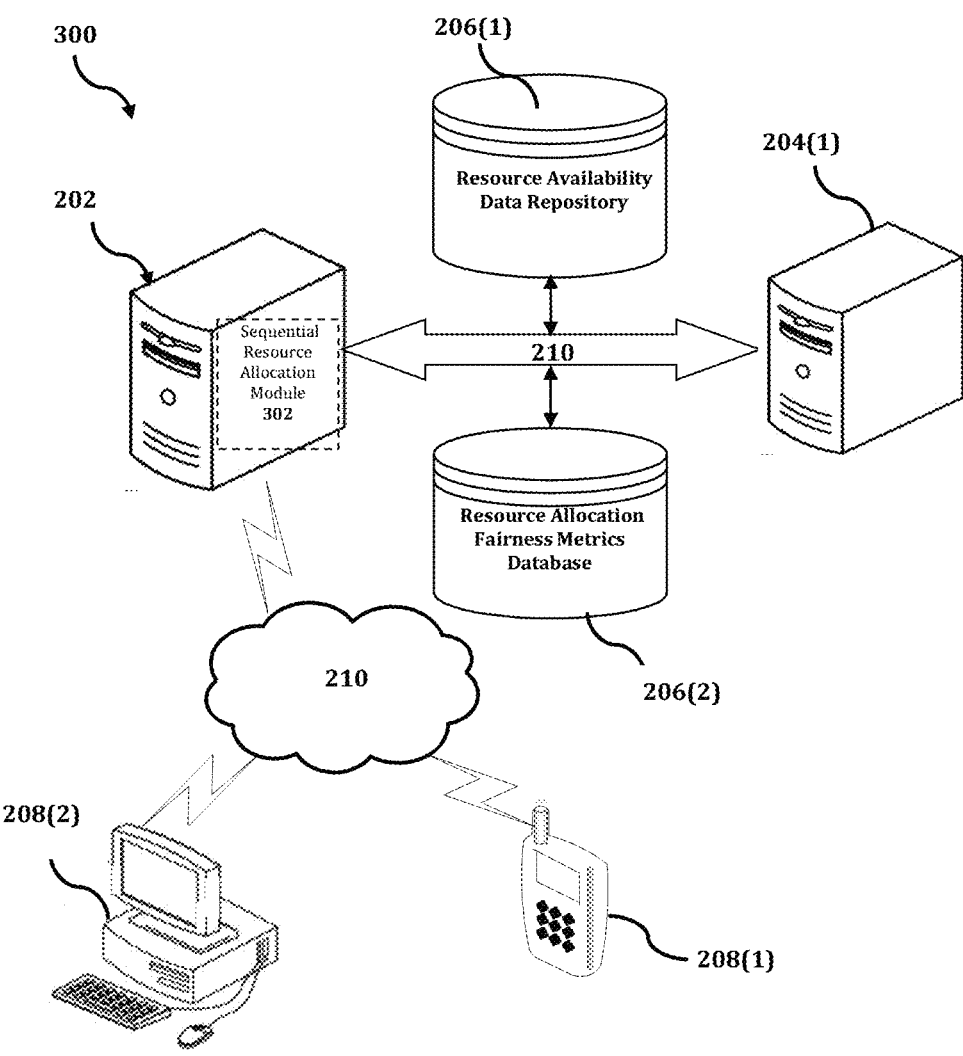
FIG. 3 shows an exemplary system for implementing a method for allocating limited resources to agents that reveal their stochastic demands on arrival over a finite horizon in a proportionally fair manner that exhausts available resource budgets.

The SRA device 202 is described and illustrated in FIG. 3 as including a sequential resource allocation module 302, although it may include other rules, policies, modules, databases, or applications, for example. As will be described below, the sequential resource allocation module 302 is configured to implement a method for allocating limited resources to agents that reveal their stochastic demands on arrival over a finite horizon in a proportionally fair manner that exhausts available resource budgets.

An exemplary process 300 for implementing a mechanism for allocating limited resources to agents that reveal their stochastic demands on arrival over a finite horizon in a proportionally fair manner that exhausts available resource budgets by utilizing the network environment of FIG. 2 is illustrated as being executed in FIG. 3. Specifically, a first client device 208(1) and a second client device 208(2) are illustrated as being in communication with SRA device 202. In this regard, the first client device 208(1) and the second client device 208(2) may be "clients" of the SRA device 202 and are described herein as such. Nevertheless, it is to be known and understood that the first client device 208(1) and/or the second client device 208(2) need not necessarily be "clients" of the SRA device 202, or any entity described in association therewith herein. Any additional or alternative relationship may exist between either or both of the first client device 208(1) and the second client device 208(2) and the SRA device 202, or no relationship may exist.

Further, SRA device 202 is illustrated as being able to access a resource availability data repository 206(1) and a resource allocation fairness metrics database 206(2). The sequential resource allocation module 302 may be configured to access these databases for implementing a method for allocating limited resources to agents that reveal their stochastic demands on arrival over a finite horizon in a proportionally fair manner that exhausts available resource budgets.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SRA device 202 via broadband or cellular communication. Of course, these embodiments are merely exemplary and are not limiting or exhaustive.

Upon being started, the sequential resource allocation module 302 executes a process for allocating limited resources to agents that reveal their stochastic demands on arrival over a finite horizon in a proportionally fair manner that exhausts available resource budgets. An exemplary process for allocating limited resources to agents that reveal their stochastic demands on arrival over a finite horizon in a proportionally fair manner that exhausts available resource budgets is generally indicated at flowchart 400 in FIG. 4.

In process 400 of FIG. 4, at step S402, the sequential resource allocation module 302 receives a request from an entity for a resource for which a predetermined maximum amount of the resource is available for allocation. In an exemplary embodiment, the resource is a limited resource, and there may be an expectation for additional requests for the resource that may be made in a sequential manner within a predetermined time interval, and an irrevocable decision about an allocation of the resource must be made, without knowledge of either the number of additional requests or the amounts of resource to be requested. In an exemplary embodiment, the resource may be any one or more of an economic resource, a power systems resource, a cloud computing resource, or any other suitable type of resource.

At step S404, the sequential resource allocation module 302 estimates a number of future requests and amounts of the source to be requested. Then, at step S406, the sequential resource allocation module 302 calculates a standard deviation of an uncertainty of at least one future request for the resource, and then uses the calculated standard deviation to adjust an estimate of a least one of the amounts. In this aspect, there is a recognition that there may be a tendency to initially reserve too much of the resource for future requests, which then tends to lead to a circumstance in which the allocation of the resource is not optimized, and therefore, the adjusted amount is usually greater than the initially estimated amount.

At step S408, the sequential resource allocation module 302 determines a first amount of the source to be allocated to the requesting entity. In an exemplary embodiment, the determination of the first amount of the resource may be made by applying an algorithm with respect to the predetermined maximum available amount of the resource and a result of the estimates generated in step S404 and as adjusted in step S406. In an exemplary embodiment, the algorithm may be designed to optimize a Nash Social Welfare (NSW) objective that is generalized for sequential settings.

At step S410, when an actual allocation of the resource has been made to the first entity and the predetermined time interval has not elapsed and there is at least one unfulfilled future request, the sequential resource allocation module 302 calculates an updated value of the maximum amount of the resource that is available for allocation based on the actual allocation of the resource that has been made to the first entity, and then repeats the estimating of step S404 and the adjusting of step S406 based on the updated value of the maximum amount of the resource that is available for allocation in order to determine a third amount of the resource to be allocated to a second entity that is different than the first entity.

At step S412, after the predetermined time interval has elapsed and thus, all subsequent future requests have been received, the sequential resource allocation module 302 uses the knowledge of those subsequent requests and the corresponding amounts of the resource that have been requested to determine an optimal hindsight allocation of the resource with respect to the entity from which the original request was received in step S402. Then, at step S414, the sequential resource allocation module 302 uses the optimal hindsight allocation to determine a fairness metric that corresponds to the entity from which that original request was received.

Problem formulation: In an exemplary embodiment, consideration is given to a supplier that has a divisible resource with limited budget size B, and N agents that arrive sequentially over T time steps requesting various numbers of units of the resource, noting that the numbers of units may include fractional numbers. At time $t \in \{1, \ldots, T\}$, agent $i \in \{1, \ldots, N\}$ arrives and reveals its demand $$X_i^t \in \mathbb{R}$$

sampled from distribution $$P_{X_i^T | X_i^1, \ldots, X_i^{t-1}}.$$

It is assumed that each agent has at least one demand over the horizon T. The supplier observes demands $$X^t = (X_1^t, \ldots, X_N^t),$$

and makes an irrevocable allocation $$A^t = (A_1^t, \ldots, A_N^t), \text{ where } A_i^t \in \mathbb{R} \geq 0$$

denotes the amount of resources allocated to agent i. It is further assumed that the allocations are immediately fulfilled by the agents and removed from the inventory. Agent i has a utility function $u(A_i, X_i)$, representing its satisfaction with the allocation $$A_i = \left(A_i^1, \ldots, A_i^T\right) \in \mathbb{R}_{\geq 0}^T$$

given its latent demands. The utility function is a non-decreasing non-negative concave function. The following utility function is considered, where an agent's utility linearly increases with its total allocation up to its total request:

$$u(A_i, X_i) = \sum_{t=1}^{T} \min\{A_i^t, X_i^t\} \qquad \text{(Expression 1)}$$

A client with the utility function in Expression 1 only values an allocation in the time window a resource was requested, and not in earlier or later windows, which is suitable in settings where the allocation process is time-sensitive and the supplier is not able to delay the decision-making outside of the current window. If all agent demands $X_1, \ldots, X_N$ are known to the supplier at the time of decision-making, they can be used for determining the allocations. This setting is referred to herein as an offline setting. However, in the online or sequential setting, the latent types of agents are gradually revealed over time, such that the supplier only learns about $$X_1^t, \ldots, X_N^t$$

at time t.

Notation: $(x)^+ = \max\{x, 0\}$. For vectors X and Y, $X \geq Y$ denotes that $X_i \geq Y_i$ for each element i. 0 denotes a zero vector. $N(\mu, \sigma^2)$ denotes the normal distribution with mean u and variance $\sigma^2$.

Fairness in Allocation Problems: The supplier aims to allocate the resource efficiently, i.e., with minimal leftover at the end of horizon T, and in a fair manner satisfying welfarist notions of fairness. In an exemplary embodiment, the Nash Social Welfare (NSW) objective may be used for the allocation fairness purpose, due to it satisfying Varian Fairness properties, such as Envy-Freeness, Pareto-Efficiency, and Proportionality. The NSW is defined as $$\prod_{i=1}^{N} u(A_i, X_i)^{w_i}$$

where $w_i \in \mathbb{R}_+$ reflects the weight assigned to agent i by the supplier. The NSW is a balanced compromise between Utilitarian Welfare objectives, which maximize the utility of a larger number of agents, and Egalitarian Welfare objectives, which maximize the utility of the worst-off agent. Since $$\underset{A_i}{\operatorname{argmax}} \prod_{i=1}^{N} u(A_i, X_i)^{w_i} = \underset{A_i}{\operatorname{argmax}} \sum_{i=1}^{N} w_i \log u(A_i, X_i) \qquad \text{(Expression 2)}$$

is true, the logarithm of NSW is often used as the objective function in allocation problems. This may be referred to as the log-NSW objective.

In the sequential setting, it is not guaranteed to have allocations that are simultaneously pareto-efficient, envy-free, and proportional. In an exemplary embodiment, one objective in the sequential setting is to find allocations that maximize the expected log-NSW in hindsight, i.e., at the end of the horizon T when all demands $X_1, \ldots, X_N$ are known. Specifically, $$\underset{A_i}{\operatorname{argmax}} \sum_{i=1}^{N} w_i \mathbb{E}_{X_i}[\log u(A_i, X_i)]. \qquad \text{(Expression 3)}$$

Fairness Metrics: Let $A_i^{online}$ denote the allocation vector of agent i given by an online algorithm subject to latent demands, and $A_i^{hindsight}$ denote the allocation vector in hindsight after all demands are revealed. The expected difference between the overall allocations for the agents can be used to measure the fairness of the online algorithm. Let $$\Delta A_i := \left| \sum_{t=1}^{T} A_i^{t,online} - \sum_{t=1}^{T} A_i^{t,hindsight} \right|,$$

then $$\Delta A^{max} = \mathbb{E}\left[ \max_i \Delta A_i \right], \ \Delta A^{mean} = \frac{1}{N} \sum_{i=1}^{N} \mathbb{E}[\Delta A_i]. \qquad \text{(Expression 4)}$$

These are respectively concerned with the worst-off agent and the average agent in terms of cumulative allocations in hindsight.

Markov Decision Process Formulation: Determining the optimal allocations under the NSW objective is a sequential decision-making problem as the allocation in one step affects the budget and allocations in future steps. In an exemplary embodiment, the problem may be formulated as a finite-horizon total-reward Markov Decision Process (MDP) modeled as a tuple $\langle \{ \mathcal{S}_t, \mathcal{A}_t, P_t, R_t \}_{t=1, \ldots, T} \rangle$ $\mathcal{S}_t$ denotes the underlying time-dependent state space, $\mathcal{A}_t$ is the action space, $P_t: \mathcal{S}_t \times \mathcal{A}_t \times \mathcal{S}_t \rightarrow \mathbb{R}_{\geq 0}$ describes the state transition dynamics conditioned upon the previous state and action, $R_t: \mathcal{S}_t \times \mathcal{A}_t \rightarrow \mathbb{R}_{\geq 0}$ is a non-negative reward function, and T is the horizon over which the resource is allocated. The goal of the supplier is to find an allocation policy $\pi_t: \mathcal{S}_t \rightarrow \mathcal{A}_t$ mapping the state to an action, in order to maximize the expected sum of rewards $$\mathbb{E}\left[ \sum_{t=1}^{T} R_t(s_t, \pi_t(s_t)) \right].$$

State Space: The state space $\mathcal{S}_t$ is time-dependent, and the state size increases with time step t since the state captures the past demand and allocation information. Specifically, the state at step t is defined as $s_t = (X^{1:t}, A^{1:t-1}, B^t)$ where $X^{1:t} := (X^1, \ldots, X^t), A^{1:t} = (A^1 \ldots, A^t)$, and $$B^t = \begin{cases} B^{t-1} - \sum_{i=1}^{N} A_i^{t-1} & t \geq 1 \\ B & t = 1 \end{cases} . \qquad \text{(Expression 5)}$$

Action Space: The action space is state-dependent and time-dependent. For any $s_t = (X^{1:t}, A^{1:t-1}, B^t) \in \mathcal{S}_t$, the following expression is true:

$$\mathcal{A}_t = \left\{ A^t \in \mathbb{R}^N : \sum_{i=1}^N A_i^t \le B^t \right\}. \qquad \text{(Expression 6)}$$

The state and action space are both continuous and therefore infinitely large. However, $\mathcal{A}_t$ is a compact polytope for any $s_t \in \mathcal{S}_t$, and $\mathcal{S}_t$ is compact if the requests are bounded.

State Transition Function: Give state $s \in \mathcal{S}_t$ and action $a \in \mathcal{A}_t$, the system transitions to the next state $s' \in S_{t+1}$ with probability $P(s,a,s') = \text{Prob}(s_{t+1} = s' | s_t = s, a_t = a)$, (Expression 7), where $$X_i^{t+1} \sim P_{X_i^{t+1} | X_i^1, \dots, X_i^t}.$$

Reward Function: The reward at time step $t \in \{1, \dots, T\}$ is defined as follows:

$$R_t(s_t, \pi_t(s_t)) = \sum_{i=1}^N \mathbb{1}\{X_i^t > 0\}.w_i\left(U_i^t - U_i^{t-1}\right), \qquad \text{(Expression 8)}$$

where $$U_i^t = \log\left(\sum_{\tau=1}^t \min\{A_i^\tau, X_i^\tau\} + \epsilon\right), t \in \{1, \dots, T\}. \qquad \text{(Expression 9)}$$

$$U_i^0 = 0,$$

and $\epsilon$ is a very small value added for numerical stability. The indicator function $$\mathbb{1}\left\{\tilde{X}_i^t > 0\right\}$$

ensures that only agents having a demand at time t are accounted for. Then, the expected sum of rewards over the entire horizon T is equivalent to the expected log-NSW objective defined in Expression 3 as $\epsilon \to 0$.

At time t, with state $s_t \in \mathcal{S}_t$ and action (allocation) $A^t \in \mathcal{A}_t$, the optimal Q-values satisfy the following Bellman optimality equation $$Q_t(s_t, A^t) = R_t(s_t, A^t) + \mathbb{E}\left[\max_{A^{t+1} \in \mathcal{A}_{t+1}} Q_{t+1}\left(s_{t+1}, A^{t+1}\right)\right]. \qquad \text{(Expression 10)}$$

The optimal policy corresponding to Expression 10 is denoted by $$\pi_t^\star.$$

Then, the optimal allocation is the solution to $$\underset{A^t}{\operatorname{argmax}} Q_t(s_t, A^t). \qquad \text{(Expression 11)}$$

Existence of an Optimal Policy: The state space of the MDP is continuous, the action space is continuous and state-dependent, and the reward is bounded and continuous due to the constant $\&$ in Expression 9. Further, it is known that a stationary optimal policy $$\pi^\star = (\pi_1^\star, \dots, \pi_T^\star)$$

exists.

If the action space is restricted to allocations that satisfy $$A_i^t \le X_i^t$$

for all i and t, then per Expression 8, the reward at step t becomes $$R_t(s_t, A^t) = \qquad \text{(Expression 12)}$$
$$\sum_{i=1}^N \mathbb{1}\{X_i^t > 0\}.w_i\left(\log\left(\tilde{A}_i^{t-1} + A_i^t + \epsilon\right) - \log\left(\tilde{A}_i^{t-1} + \epsilon\right)\right),$$

where $$\tilde{A}_i^t := \sum_{\tau=1}^t A_i^\tau$$

denotes the cumulative allocated resources to agent i until time t. At time step T, $$\pi_T^\star$$

maximizes $Q_T(s_T, A^T) = R_T(s_T, A^T)$ which does not depend on future allocations. The optimal allocation $A^{T*}$ can be directly computed from $Q_T$ since there is no uncertainty about future demands. Then, the optimal policy for all t can be derived by recursively solving Expression 11 backward in time. This quickly becomes computationally intractable, which motivates an effort to find alternative solutions that trade off sub-optimality for computational efficiency.

Offline Setting-Allocations in Hindsight: If the supplier could postpone the decision-making until the end of the horizon T, it would have perfect knowledge of all demands $X^1, \dots, X^T$. Let $$\tilde{X}_i = \sum_{\tau=1}^T X_i^\tau$$

denote the total demands of agent i. Then, the supplier solves the following convex program, referred to herein as the Eisenberg-Gale program, in order to maximize the NSW objective in Expression 3 for allocations $\tilde{A} = (\tilde{A}_1, \dots, \tilde{A}_N)$.

$$\max_{\tilde{A} \geq 0} \sum_{i=1}^{N} w_i \log(u(\tilde{A}_i, \tilde{X}_i))$$ (Expression 13)

$$\text{s.t. } \sum_{i=1}^{N} \tilde{A}_i \leq B.$$

With the utility function defined in Expression 1, allocating resources beyond the client's request does not increase the utility. Therefore, solving Expression 13 is equivalent to the following:

$$\max_{\tilde{A}} \sum_{i=1}^{N} w_i \log(\tilde{A}_i)$$ (Expression 14)

$$\text{s.t. } 0 \leq \tilde{A}_i \leq \tilde{X}_i, i = 1, \dots, N$$

$$\sum_{i=1}^{N} \tilde{A}_i \leq B.$$

Then, any distribution of agent i's allocation $\tilde{A}_i$ across the T time steps that satisfies the demand constraint at each step, would be an optimal allocation in hindsight $A_i^{hindsight}$, i.e., $$A_i^{hindsight} \in \left\{ (A_i^1, \dots, A_i^T) : 0 \leq A_i^t \leq X_i^t, \forall t, \sum_{\tau=1}^{T} A_i^t = \tilde{A}_i \right\}.$$ (Expression 15)

FIG. 5 is an algorithm 500 to be applied for providing an optimal solution to a water-filling problem where an objective is to allocate limited resources to agents with differently weighted importance and the allocation is performed after the requests are observed, in a proportionally fair manner that exhausts available resource budgets, according to an exemplary embodiment.

The optimal solution to Expression 14 takes the form $$\tilde{A}_i^* = \min\{\tilde{X}_i, \mu\},$$

where μ is a function of budget B and demands $\tilde{X}$ such that $$\sum_{i=1}^{N} \tilde{A}_i = B.$$

Referring to FIG. 5, the solution can be efficiently derived by the water-filling algorithm 500 given as Algorithm 1, and the threshold u can be interpreted as a water level. In line 3 of Algorithm 1, the agents are ordered according to their demands and weights, such that agents with smaller demands and higher weights are prioritized. This ordering determines which agent is used to compute the water level μ. For each selected agent $i_j$, the condition in line 7 determines whether there is enough budget to fully satisfy agent $i_j$'s demand. If there is enough budget, agent $i_j$ receives its full request, as shown at line 11, and the supplier moves on to the next agent in order. Otherwise, the available budget is proportionally divided among the remaining agents, as shown at line 8, while ensuring $$\sum_{k=j}^{N} \tilde{A}_{i_k} = B.$$

Sequential Setting—Heuristic Algorithm: In an exemplary embodiment, an intuitive online algorithm referred to herein as Sequential Algorithms with Fairness based on Future Estimates (SAFFE) is provided. The SAFFE algorithm uses the hindsight solution corresponding to the offline setting described above. In an exemplary embodiment, by substituting unobserved future requests with their expectations derived from demand distributions estimated from historical data, the sequential decision-making problem may be converted into solving the offline problem in each time step. To this end, at each time step, an estimate of the expected future demands is used to determine the total resources expected to be allocated to each agent by time T. This allows for a reservation of a portion of the available budget for future demands. Specifically, at t=1, . . . , T, the following problem is solved:

$$\max_{C^t} \sum_{i=1}^{N} \mathbb{1}\{Y_i^t > 0\}.w_i \log(\tilde{A}_i^t + C_i^t)$$ (Expression 16)

$$\text{s.t. } 0 \leq C_i^t \leq Y_i^t, \forall i, \sum_{i=1}^{N} C_i^t \leq B^t,$$

where $$Y_i^t = X_i^t + \mathbb{E}\left[ \sum_{\tau=t+1}^{T} X_i^\tau \right], i = 1, \dots, N.$$ (Expression 17)

The indicator function $$\mathbb{1}\{Y_i^t > 0\}$$

ensures that consideration is not given to absent agents, i.e., those with no current or expected future demands.

$$C_i^t$$

denotes the total allocation for agent i over the period t, . . . . T if it were possible to perfectly estimate future demands and if the arrived as their expectation. In other words, $$C_i^t$$

consists if the allocation in the current time step and the reserved allocations for the future. Then, the current allocation $$A_i^t$$

is a fraction of $$C_i^t$$

derived as $$A_i^t = C_i^t \frac{X_i^t}{Y_i^t}.$$ (Expression 18)

FIG. 6 is an algorithm 600 to be applied for providing sequential allocations with fairness based on future estimates in a method for allocating limited resources to agents that reveal their stochastic demands on arrival over a finite horizon in a proportionally fair manner that exhausts available resource budgets, according to an exemplary embodiment. Referring to FIG. 6, similar to the hindsight problem as described above and expressed as Expression 14, it is possible to efficiently solve Expression 16 by using a variant 600 of the water-filling algorithm given in Algorithm 2. At time step t, the water level $\mu_T$ is calculated by accounting for all previous allocations to the agents and their total expected future demands.

SAFFE—Discounted Algorithm: While SAFFE is simple and easy to interpret, it is sub-optimal. In an exemplary embodiment, it may be shown that SAFFE maximizes an upper bound of the optimal Q-values of the MDP as described above. This implies that SAFFE over-estimates the expected reward gain from the future and reserves the budget excessively for future demands. Thus, in an exemplary embodiment, in order to correct this over-reservation, an algorithm referred to herein as SAFFE-Discounted (SAFFE-D) is provided, which penalizes uncertain future requests by their standard deviations. At every step t, the SAFFE-D algorithm computes $$Y_i^t = X_i^t + \sum_{\tau=t+1}^{T} (\mathbb{E}[X_i^\tau] - \lambda \, std(X_i^\tau))^+$$ (Expression 19)

for some regularization parameter $\lambda \geq 0$ and solves Expression 16. As in SAFFE, the current allocation $$A_i^t$$

is split proportionally from $$C_i^t$$

according to Expression 18. The regularizer $\lambda$ is a hyper-parameter that can be tuned using historical data to provide the optimal trade-off between consuming too much of the budget at the current step and reserving too much for the future. In this aspect, the uncertainty in future demands decreases as the horizon T is approached, and better performance is expected with a decreasing time-dependent function such as $\lambda(t) = \sqrt{T-t}\lambda$ for some $\lambda > 0$. Alternatively, the $\lambda(t)$ can be learned as a function of time.

In an exemplary embodiment, an objective is to design a sequential allocation algorithm that is close to being optimal in hindsight, maximizing the expected NSW objective as provided in Expression 3. In order to determine how sub-optimal SAFFE-D is, an upper bound of the performs gap between SAFFE-D and the hindsight solution is derived in terms of $\Delta A^{max}$ as shown in Expression 4.

Let $A^{oracle}$ denote the allocations derived using SAFFE-D in a setting where an oracle has perfect knowledge of the sequence of incoming demands, i.e., when SAFFE-D is used with no stochasticity. This may be referred to has SAFFE-Oracle. The upper bound for $\Delta A^{max}$, i.e., the distance between $A^{SAFFE-D}$ and $A^{hindsight}$, may be computed in two steps: by bounding the distance between SAFFE-D and SAFFE-Oracle, and then by bounding the distance between SAFFE-Oracle and hindsight.

SAFFE—Discounted versus SAFFE-Oracle: Under mild assumptions on distribution of requests, the distance between solutions of SAFFE-D and SAFFE-Oracle may be quantified via the use of concentration inequalities for deviation of future requests from their expected values. The following definitions are provided:

$$\overline{Y}_i^t = X_i^t + \mathbb{E}\left[\sum_{\tau=t+1}^{T} X_i^\tau\right] + \frac{\sqrt{T-t}}{\sqrt{\xi}} std(X_i^\tau)$$ (Expression 20)

and $$\underline{Y}_i^t = X_i^t + \mathbb{E}\left[\sum_{\tau=t+1}^{T} X_i^\tau\right] - \frac{\sqrt{T-t}}{\sqrt{\xi}} std(X_i^\tau).$$ (Expression 21)

For simplicity, it is assumed that agent i's requests are independent and identically distributed. Then, for $\xi > 0$, with probability at least $1-\xi$, Chebyshev's inequality yields $$\underline{Y}_i^t \leq X_i^t + \sum_{\tau=t+1}^{T} X_i^\tau \leq \overline{Y}_i^t.$$ (Expression 22)

It is further assumed that all agents have equal standard deviations $$std(X_i^t),$$

but expectations may differ. The worst case scenario bound is provided first; in this circumstance, highly unbalanced future requests for different agents are allowed, i.e., there is an agent k such that $$\underline{Y}_k^t \geq \overline{Y}_j^t$$

for all other agents j≠k.

Theorem 1—Unbalanced Requests Bound: Let $$A_i^{t,SAFFE-D} \text{ and } A_i^{t,oracle}$$

denote allocations by SAFFE-D for $$\lambda(t) = \sqrt{\frac{T-t}{\xi}}$$

and SAFFE-Oracle, respectively. Then, for all agents i, (Expression 23)

$$\left| A_i^{t,\,SAFFE-D} - A_i^{t,\,oracle} \right| \le$$

$$\begin{cases} 2N\sqrt{\dfrac{(T-t)}{\xi}}\,std(X_i^t) & \text{if } B^t \le \sum_{i=1}^{N} \overline{Y}_i^t, \\ 4\sqrt{\dfrac{(T-t)}{\xi}}\,std(X_i^t) & \text{if } B^t \ge \sum_{i=1}^{N} \overline{Y}_i^t \end{cases}$$

with probability at least 1–ξ.

Proof: Intuitively, the discrepancy sales with the number of agents, because if all j≠k submit requests according to their upper bound $$\overline{Y}_j^t,$$

then water level moves so that their SAFFE-Oracle allocations increase compared to SAFFE-Oracle with $$\underline{Y}_j^t,$$

and this happens on the account of agent j who now gets less. Finally, using Expression 22 completes the proof, as the discrepancy can be translated between SAFFE-Oracle with $$\underline{Y}_i^t \text{ and } \overline{Y}_i^t$$

to that between SAFFE-D and SAFFE-Oracle with $$Y_i^t.$$

In order to move beyond the worst case scenario of highly unbalanced requests distributions, it is now assumed that $$\overline{Y}_i^t \text{ and } \underline{Y}_i^t$$

are same for all agents, i.e., if their requests have same distribution, then the discrepancy between allocation scales better.

Theorem 2—Balanced Requests Bound: If for any two clients i and j the same bounds exist as in Expression 22, i.e., $$\overline{Y}_i^t = \overline{Y}_j^t \text{ and } \underline{Y}_i^t = \underline{Y}_j^t,$$

then for all agents i, (Expression 24)

$$\left| A_i^{t,\,SAFFE-D} - A_i^{t,\,oracle} \right| \le$$

$$\begin{cases} 0 & \text{if } B^t \le \sum_{i=1}^{N} \underline{Y}_i^t \\ 4\sqrt{\dfrac{(T-t)}{\xi}}\,std(X_i^t) & \text{if } B^t \ge \sum_{i=1}^{N} \underline{Y}_i^t \end{cases}$$

with probability at least 1–ξ. The proof is similar to that provided above for Theorem 1.

In an exemplary embodiment, the next step is to show that SAFFE-Oracle achieves optimal allocation in hindsight. Theorem 3: For all i, the following holds:

(Expression 25)

$$\sum_{t=1}^{T} A_i^{t,\,oracle} = \tilde{A}_i,$$

where $\tilde{A}_i$ is the solution to the Eisenberg-Gale program per Expression 13. The proof relies on two observations. Firstly, for t=1, the sum of allocation for the current step and the reserved allocations for the future $$C_i^1,$$

equals the solution $\tilde{A}_i$ of the Eisenberg-Gale problem per Expression 13. Secondly, SAFFE-Oracle fully distributes the total reserved allocation for the future by the end of the horizon T.

Theorem 4—Gap between SAFFE-D and Hindsight: In the unbalanced requests setting for the cap between SAFFE-D and hindsight measured by $\Delta A^{max}$ introduced in Expression 4, the following holds:

(Expression 26)

$$\Delta A^{max} \le N \frac{T^{3/2}}{\sqrt{\xi}} std(X_i^t).$$

In the balanced requests setting, the following holds:

(Expression 27)

$$\Delta A^{max} \le \frac{2T^{3/2}}{\sqrt{\xi}} std(X_i^t).$$

Proof: Firstly, it is noted that Theorem 3 guarantees that $$\Delta A^{max} = \mathbb{E}\left[ \max_i \left| \sum_{t=1}^{T} A^{t,\,SAFFE-D} - \sum_{t=1}^{T} A^{t,\,oracle} \right| \right],$$

as SAFFE-Oracle achieves hindsight solution. Then, Theorems 1 and 2 may be employed together with the triangle inequality in order to obtain an upper bound on the right hand side. In the case of unbalanced requests, this upper bound may be expressed as $$\Delta A^{max} \le N \frac{T^{3/2}}{\sqrt{\xi}} std(X_i^t).$$

In the case of balanced requests, this upper bound may be expressed as $$\Delta A^{max} \le \frac{2T^{3/2}}{\sqrt{\xi}} std(X_i^t).$$

Finally, as $\Delta A^{mean} \le \Delta A^{max}$, Theorem 4 also provides an upper bound on $\Delta A^{mean}$.

In an exemplary embodiment, the SAFFE-D algorithm may be evaluated under various settings, and its performance may be compared with baseline sequential allocation algorithms in terms of fairness metrics and resource allocation efficiency. IN particular, the metrics may be used to assess how the fairness of SAFFE-D allocations is affected as the budget size, number of agents, and time horizon varies; whether the algorithm favors agents depending on their arrival times or demand sizes; how sensitive the algorithm is to future demand estimation errors; how the discounting in SAFFE-D improves fairness; and how SAFFE-D compares to an allocation algorithm learned using reinforcement learning for the described MDP.

In an exemplary embodiment, consideration is given to the following types of metrics for comparing the fairness and efficiency of sequential allocation algorithms: 1) Log-NSW: Expected log-NSW in hindsight as in Expression 3. 2) Utilization percentage: The fraction of available budget distributed to the agents over the horizon. Due to stochasticity, it is possible to have an overabundance of initial budget such that it exceeds the total demands over the horizon. Therefore, this metric is defined by only considering the required fraction of the available budget B as follows:

$$\frac{\sum_{i=1}^{N} \sum_{i=1}^{T} A_i^t}{\min\left\{B, \sum_{i=1}^{N} \sum_{i=1}^{T} X_i^t\right\}} \times 100$$

3) $\Delta A^{mean}$ and $\Delta A^{max}$: The expected average and maximum normalized deviation of per-agent cumulative allocations compared to hindsight allocations as defined in Expression 4. To facilitate comparisons, compared to Expression 4, these metrics may be normalized with respect to hindsight as $$\frac{\Delta A_i}{\sum_{t=1}^{T} A_i^{t, hindsight}}.$$

Since these metrics measure distance, an algorithm with lower $\Delta A$ is considered more fair in terms of this metric.

Accordingly, with this technology, an optimized process for allocating limited resources to agents that reveal their stochastic demands on arrival over a finite horizon in a proportionally fair manner that exhausts available resource budgets is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method executed by at least one processor, the method comprising:

receiving, by the at least one processor from a first entity, a first request for an allocation of a first amount of a cloud computing resource for the first entity, wherein the cloud computing resource has a predetermined maximum amount of the cloud computing resource available for allocation during a predetermined time interval, and wherein the allocation is an irrevocable allocation;

fulfilling, by the first entity responsive to an actual allocation of the first amount of the cloud computing resource to the first entity, the first request, wherein:

utility of the first entity is increased and the first amount of the cloud computing resource is removed from the predetermined maximum amount of the cloud computing resource responsive to the actual allocation of the first amount of cloud computing resource to the first entity, the first amount is less than the predetermined maximum amount of the cloud computing resource, the first amount of the cloud computing resource is based on a first adjustment to a standard deviation of an uncertainty of an estimated number of a first plurality of future requests to be received by the at least one processor and amounts of the cloud computing resource estimated to be requested within the predetermined time interval prior to receiving the estimated number of first plurality of future requests, and the first plurality of future requests are to be received by the at least one processor sequentially and subsequent to the first request, when the actual allocation of the cloud computing resource has been made to the first entity, the predetermined time interval has not elapsed, and there is at least one unfulfilled future request of the plurality of future requests:

the maximum amount of the cloud computing resource that remains available for allocation based on the actual allocation of the cloud computing resource that has been made to the first entity is updated, and a second amount of the cloud computing resource to be sequentially allocated to a second entity is based on a second adjustment to a standard deviation of an uncertainty of an estimated number of a second plurality of future requests to be received by the at least one processor and amounts of the cloud computing resource of the updated maximum amount of the cloud computing resource that remains available for allocation estimated to be requested within the predetermined time interval prior to receiving the estimated number of second plurality of future requests, wherein the second plurality of future requests are to be received by the at least one processor sequentially and subsequent to the first plurality of future requests; and fulfilling, by the second entity, a sequential allocation of the second amount of the cloud computing resource to the second entity, wherein:

the sequential allocation occurs subsequent to the actual allocation of the first amount of the cloud computing resource to the first entity, the second amount is different from the first amount, and the second entity is different from the first entity.

2. The method of claim 1, wherein the actual allocation of the first amount of the cloud computing resource to the first entity is further based on a first algorithm associated with the predetermined maximum amount of the cloud computing resource and the first adjustment.

3. The method of claim 2, wherein the first algorithm optimizes a Nash Social Welfare (NSW) objective that is generalized for sequential settings.

4. The method of claim 1, further comprising: when the predetermined time interval has elapsed, an optimal hindsight allocation of the cloud computing resource with respect to the first entity is based on actual numbers of requests and the amounts of the cloud computing resource estimated to be requested during the predetermined time interval.

5. The method of claim 4, wherein a fairness metric that corresponds to the first entity is based on the optimal hindsight allocation with respect to at least one from among the first amount and the second amount.

6. A computing apparatus comprising:

a processor;

a memory; and a communication interface coupled to each of the processor and the memory, wherein the processor is configured to:

receive, via the communication interface from a first entity, a first request for an allocation of a first amount of a cloud computing resource for the first entity, wherein the cloud computing resource has a predetermined maximum amount of the cloud computing resource available for allocation during a predetermined time interval, and wherein the allocation is an irrevocable allocation;

fulfill, by the first entity responsive to an actual allocation of the first amount of the cloud computing resource to the first entity, the first request, wherein:

utility of the first entity is increased and the first amount of the cloud computing resource is removed from the predetermined maximum amount of the cloud computing resource responsive to the actual the allocation of the first amount of the cloud computing resource to the first entity, the first amount is less than the predetermined maximum amount of the cloud computing resource, the first amount of the cloud computing resource is based on a first adjustment to a standard deviation of an uncertainty of an estimated number of a first plurality of future requests to be received by the at least one processor and amounts of the cloud computing resource estimated to be requested within the predetermined time interval prior to receiving the estimated number of first plurality of future requests, and the first plurality of future requests are to be received by the communication interface sequentially and subsequent to the first request, when the actual allocation of the cloud computing resource has been made to the first entity, the predetermined time interval has not elapsed, and there is at least one unfulfilled future request of the plurality of future requests:

the maximum amount of the cloud computing resource that remains available for allocation based on the allocation of the cloud computing resource that has been made to the first entity is updated, and a second amount of the cloud computing resource to be sequentially allocated to a second entity is based on a second adjustment to a standard deviation of an uncertainty of an estimated number of a second plurality of future requests to be received by the communication interface and amounts of the cloud computing resource of the updated maximum amount of the cloud computing resource that remains available for allocation estimated to be requested within the predetermined time interval prior to receiving the estimated number of second plurality of future requests, wherein the second plurality of future requests are to be received by the communication interface sequentially and subsequent to the first plurality of future requests; and fulfill, by the second entity, a sequential allocation of the second amount of the cloud computing resource to the second entity, wherein:

the sequential allocation occurs subsequent to the actual allocation of the first amount of the cloud computing resource to the first entity, the second amount is different from the first amount, and the second entity is different from the first entity.

7. The computing apparatus of claim 6, wherein the actual allocation of the first amount of the cloud computing resource to the first entity is further based on a first algorithm associated with the predetermined maximum amount of the cloud computing resource and the first adjustment.

8. The computing apparatus of claim 7, wherein the first algorithm optimizes a Nash Social Welfare (NSW) objective that is generalized for sequential settings.

9. The computing apparatus of claim 6, wherein when the predetermined time interval has elapsed, an optimal hindsight allocation of the cloud computing resource with respect to the first entity is based on actual numbers of requests and the amounts of the cloud computing resource estimated to be requested during the predetermined time interval.

10. The computing apparatus of claim 9, wherein a fairness metric that corresponds to the first entity is based on the optimal hindsight allocation with respect to at least one from among the first amount and the second amount.

11. A non-transitory computer readable storage medium storing instructions which, when executed by a processor, causes the processor to:

receive, by the processor from a first entity, a first request for an allocation of a first amount of a cloud computing resource for the first entity, wherein the cloud computing resource has a predetermined maximum amount of the cloud computing resource available for allocation during a predetermined time interval, and wherein the allocation is an irrevocable allocation;

fulfill, by the first entity responsive to an actual allocation of the first amount of the cloud computing resource to the first entity, the first request, wherein:

utility of the first entity is increased and the first amount of the cloud computing resource is removed from the predetermined maximum amount of the cloud computing resource responsive to the actual the allocation of the first amount of the cloud computing resource to the first entity, the first amount is less than the predetermined maximum amount of the cloud computing resource, the first amount of the cloud computing resource is based on a first adjustment to a standard deviation of an uncertainty of an estimated number of a first plurality of future requests to be received by the at least one processor and amounts of the cloud computing resource estimated to be requested within the predetermined time interval prior to receiving the estimated number of first plurality of future requests, and the first plurality of future requests are to be received by the processor sequentially and subsequent to the first request, when the actual allocation of the cloud computing resource has been made to the first entity, the predetermined time interval has not elapsed, and there is at least one unfulfilled future request of the plurality of future requests:

the maximum amount of the cloud computing resource that remains available for allocation based on the allocation of the cloud computing resource that has been made to the first entity is updated, and a second amount of the cloud computing resource to be sequentially allocated to a second entity is based on a second adjustment to a standard deviation of an uncertainty of an estimated number of a second plurality of future requests to be received by the processor and amounts of the cloud computing resource of the updated maximum amount of the cloud computing resource that remains available for allocation estimated to be requested within the predetermined time interval prior to receiving the estimated number of second plurality of future requests, wherein the second plurality of future requests are to be received by the processor sequentially and subsequent to the first plurality of future requests; and fulfill, by the second entity, a sequential allocation of the second amount of the cloud computing resource to the second entity, wherein:

the sequential allocation occurs subsequent to the actual allocation of the first amount of the cloud computing resource to the first entity, the second amount is different from the first amount, and the second entity is different from the first entity.

12. The storage medium of claim 11, wherein the actual allocation of the first amount of the cloud computing resource to the first entity is further based on a first algorithm associated with the predetermined maximum amount of the cloud computing resource and the first adjustment.

13. The storage medium of claim 12, wherein the first algorithm optimizes a Nash Social Welfare (NSW) objective that is generalized for sequential settings.

14. The storage medium of claim 11, wherein when the predetermined time interval has elapsed, an optimal hindsight allocation of the cloud computing resource with respect to the first entity is based on actual numbers of requests and the amounts of the cloud computing resource estimated to be requested during the predetermined time interval.

15. Storage medium of claim 14, wherein a fairness metric that corresponds to the first entity is based on the optimal hindsight allocation with respect to at least one from among the first amount and the second amount.

* * * * *